United States Patent
Mirza et al.

(10) Patent No.: US 7,424,344 B2
(45) Date of Patent: Sep. 9, 2008

(54) HVAC CONTROL USING MODULATED EVAPORATOR OUTLET TEMPERATURE

(75) Inventors: Raza Mirza, Lake Orion, MI (US); Michael A Zabat, Rochester Hills, MI (US); Erik Brom, Winona, MN (US); Gary L. Baker, Carleton, MI (US); Christopher P Thomas, Commerce, MI (US); David K Ganss, South Lyon, MI (US)

(73) Assignees: Chrysler LLC, Auburn Hills, MI (US); Kelsey-Hayes Company, Winona, MN (US)

( * ) Notice: Subject to any disclaimer, the term of this patent is extended or adjusted under 35 U.S.C. 154(b) by 158 days.

(21) Appl. No.: 11/304,274

(22) Filed: Dec. 15, 2005

(65) Prior Publication Data

US 2006/0142898 A1 Jun. 29, 2006

Related U.S. Application Data

(60) Provisional application No. 60/639,194, filed on Dec. 23, 2004.

(51) Int. Cl.
*B60H 1/00* (2006.01)
*F25B 49/00* (2006.01)

(52) U.S. Cl. .......................... 700/276; 62/132; 165/202

(58) Field of Classification Search ................. 700/300, 700/276; 62/215, 132, 208, 227; 165/202; 236/49.3
See application file for complete search history.

(56) References Cited

U.S. PATENT DOCUMENTS

| 4,476,919 | A | * | 10/1984 | Akimoto et al. | ............. 165/202 |
| 4,848,444 | A | | 7/1989 | Heinle et al. | |
| 4,858,677 | A | * | 8/1989 | Doi et al. | .................... 165/202 |
| 5,335,514 | A | * | 8/1994 | Hennessee et al. | ............. 62/227 |
| 5,533,353 | A | * | 7/1996 | Baker et al. | ................... 62/227 |
| 5,993,312 | A | * | 11/1999 | Panoushek et al. | ............. 460/1 |
| 6,016,964 | A | * | 1/2000 | Ohkubo | ....................... 236/13 |
| 6,293,116 | B1 | | 9/2001 | Forrest et al. | |
| 2004/0031601 | A1 | * | 2/2004 | Dage et al. | .................. 165/203 |
| 2004/0134209 | A1 | * | 7/2004 | Komura et al. | ................. 62/215 |

* cited by examiner

*Primary Examiner*—Albert DeCady
*Assistant Examiner*—Steven R Garland
(74) *Attorney, Agent, or Firm*—Ralph E. Smith

(57) ABSTRACT

A vehicle climate control system operates an evaporator at a minimum temperature adjusted by a temperature offset. The control system determines a desired temperature and a blend potentiometer position that is indicative of the desired temperature. The control system determines a target temperature for the evaporator according to the blend potentiometer position, and calculates the temperature offset according to the target temperature and the blend potentiometer position. A blend door position is controlled according to the blend potentiometer position, the target temperature, the temperature offset, and heater core air temperature in order to optimize the operation of the evaporator.

12 Claims, 5 Drawing Sheets

| Minimum Blend Potentiometer Position | Target Evaporator Air Temperature | Conventional Low Band | Low Band | Offset, Software Units | Offset, Degrees F |
|---|---|---|---|---|---|
| 0 | 38 | 38 | 38 | 0 | 0 |
| 6 | 41 | 38 | 38 | 0 | 0 |
| 22 | 50 | 38 | 42 | 40 | 4 |
| 70 | 76 | 38 | 50 | 120 | 12 |
| 255 | 178 | 38 | 50 | 120 | 12 |

HVAC CONTROL USING MODULATED EVAPORATOR OUTLET TEMPERATURE

CROSS-REFERENCE TO RELATED APPLICATIONS

This application claims benefit of U.S. provisional patent application Ser. No. 60/639,194 filed Dec. 23, 2004, the disclosure of which is hereby incorporated by reference.

FIELD OF THE INVENTION

The present invention relates to vehicle climate control, and more particularly to a method for dynamically controlling vehicle climate according to a comfort zone.

BACKGROUND OF THE INVENTION

A climate control system 10 in a vehicle regulates temperature and humidity in the vehicle as shown in FIG. 1. The climate control system 10 includes a compressor 12, a condenser 14, an expansion element 16, an evaporator 18, and a heater core 20. The compressor 12 moves a refrigerant through the refrigeration circuit of the climate control system 10, which includes the compressor 12, the condenser 14, the expansion element 16, and the evaporator 18. The compressor 12, which may be a cycling compressor or a variable displacement compressor, compresses and circulates the refrigerant vapor through the condenser 14. The condenser 14 condenses the refrigerant vapor into a liquid and rejects heat, thereby cooling the liquid. The condenser 14 passes the liquid through the expansion element 16, such as an expansion valve, into the evaporator 18. The cooled refrigerant liquid passes through the evaporator 18 and returns to the compressor 12 as vapor.

A blower or fan 22 forces air 24 through the evaporator 18 and the heater core 20 into a passenger compartment 26. As the refrigerant liquid inside the evaporator 18 cools the air 24, the liquid absorbs heat from the air 24 and returns to vapor. The evaporator 18 cools the air 24 to a minimum temperature. Typically, the evaporator 18 is configured to cool the air 24 to a temperature just above freezing, effectively removing all humidity from the air 24. A portion of the air 24 then passes through the heater core 20. The heater core 20 is connected to the vehicle's coolant system 28, which circulates water solution through the heater core 20. For example, the water solution may include 50% water and 50% glycol. In this manner, the heater core 20 heats a portion of the air 24 according to a desired temperature, which is further determined from passenger feedback or thermostat controls. The heated air is recirculated with the cooled air to achieve the desired temperature and circulated into the passenger compartment 26. Additionally, the climate control system 10 may include a controller (not shown) that communicates with components such as the compressor 12, the evaporator 18, and the blower 22.

As described, the climate control system 10 operates to cool the air 24 to a low band temperature, such as a minimum temperature, regardless of the desired temperature, and then subsequently reheats the air. For example, the low band may be slightly above freezing, or 38° F. Alternatively, the climate control system 10 may adjust the low band according to other factors, such as the speed of the blower 22, a mode setting, and the desired temperature. For example, the mode setting can be used to select panel, bi-level, floor, mixed, and defrost modes as are known in the art. Therefore, elements of the climate control system 10, such as the compressor 12, operate more than necessary and increase fuel consumption. In certain circumstances, maximum climate control usage may account for as much as a 4 mile per gallon increase of fuel consumption.

SUMMARY OF THE INVENTION

A vehicle climate control system comprises determining a desired temperature. A target temperature for air output from an evaporator that is indicative of the desired temperature is determined. A temperature offset is calculated according to the desired temperature and the target temperature. The air is cooled according to a minimum temperature adjusted by the temperature offset.

In another aspect of the invention, a vehicle climate control method comprises selecting a desired temperature. A blend door position that is indicative of the desired temperature is determined. An evaporator temperature that is indicative of at least one of the desired temperature and/or the blend potentiometer position is determined. A temperature offset is calculated according to at least one of the desired temperature, the blend potentiometer position, and/or the evaporator temperature. A heater core air temperature is determined. A blend door position is calculated according to the blend potentiometer position, the evaporator temperature, the temperature offset, and/or the heater core air temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
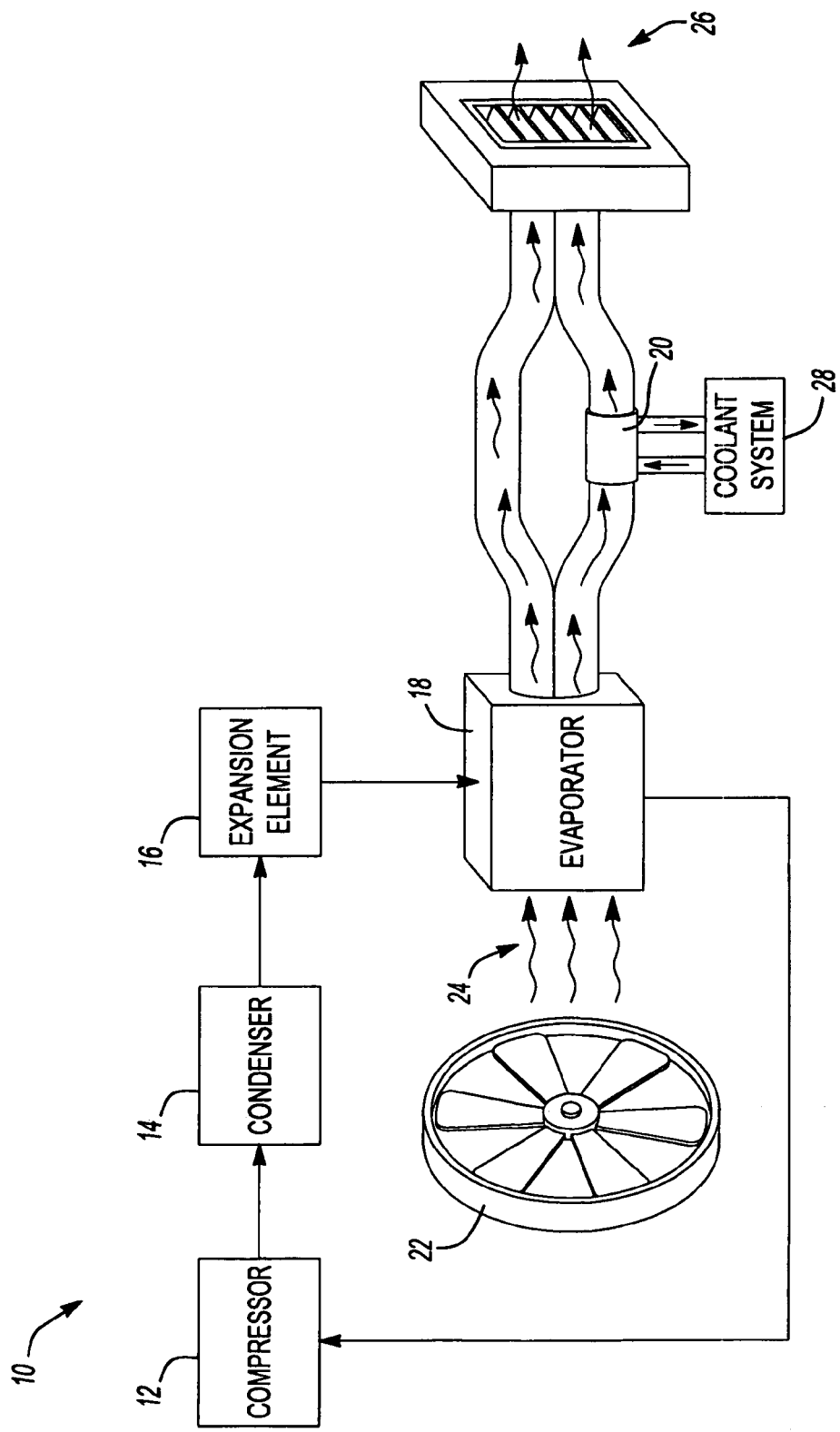
FIG. 1 is a block diagram of a climate control system for a vehicle according to the prior art.
Figure 2:
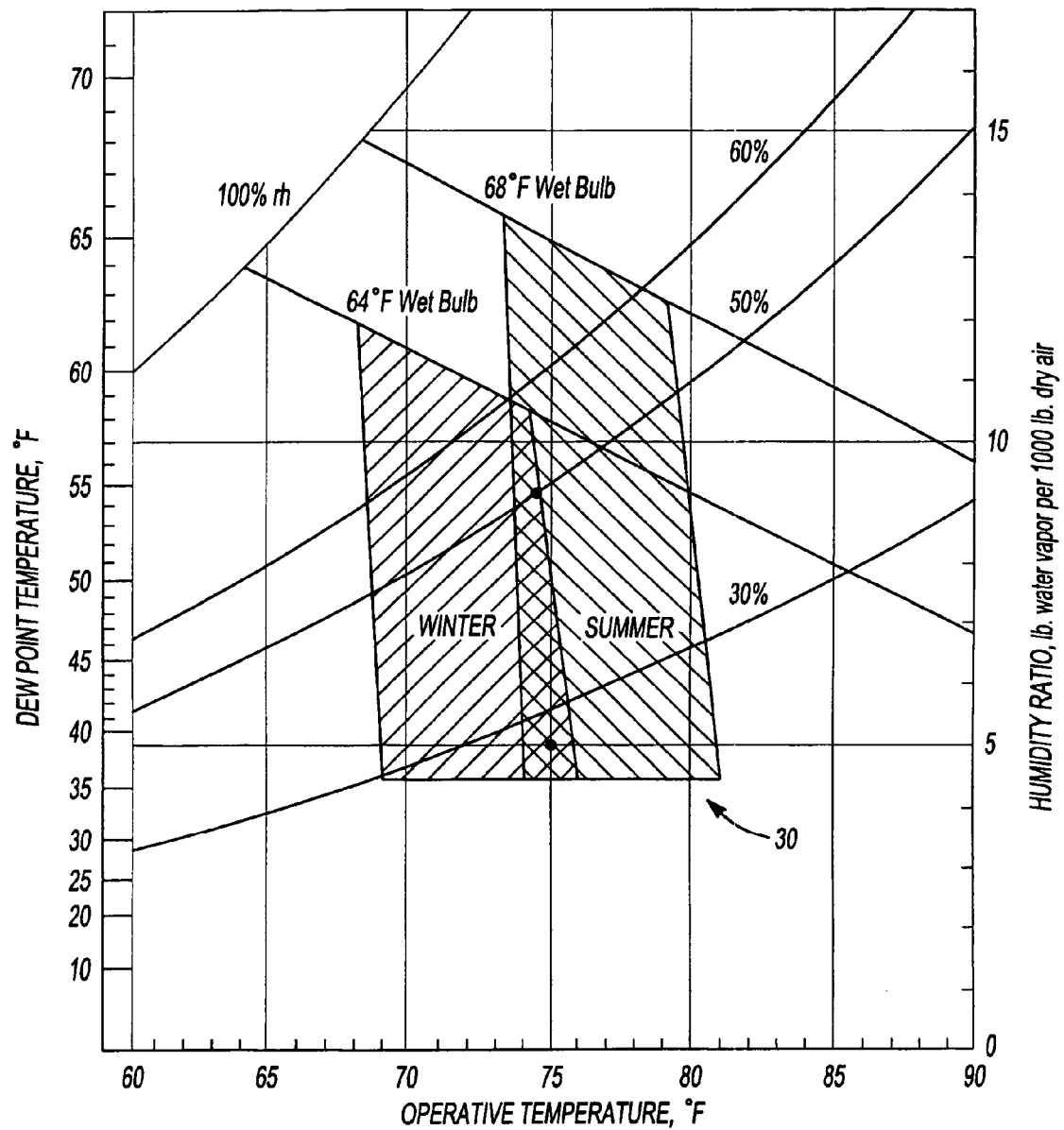
FIG. 2 illustrates comfort zones for summer and winter according to ASHRAE standards.

A passenger comfort zone 30 according to the American Society of Heating, Refrigerating and Air-Conditioning Engineers (ASHRAE) as shown in FIG. 2. The comfort zone 30 is determined based on acceptable conditions for passengers according to factors such as temperature, humidity, season, and clothing. For example, clothing type worn by passengers, as well as humidity, may be different in the winter than in the summer, and the comfort zone 30 takes these factors into consideration. Hereinafter, "comfort zone" refers to the ASHRAE comfort zone 30.

Rather than operating the evaporator to cool the air to the minimum temperature, the present invention operates the evaporator to cool the air to a temperature higher than the conventional minimum temperature in order to avoid excessive cycling of the compressor. In other words, instead of cooling the air to the minimum temperature and then reheating the air, the invention cools the air to a temperature that more accurately corresponds to the desired temperature of the passengers. In the preferred embodiment, the controller determines the low band according to the minimum temperature and an offset that is applied to the desired temperature, in addition to the blower speed and the mode setting.

Figures 3, 4:
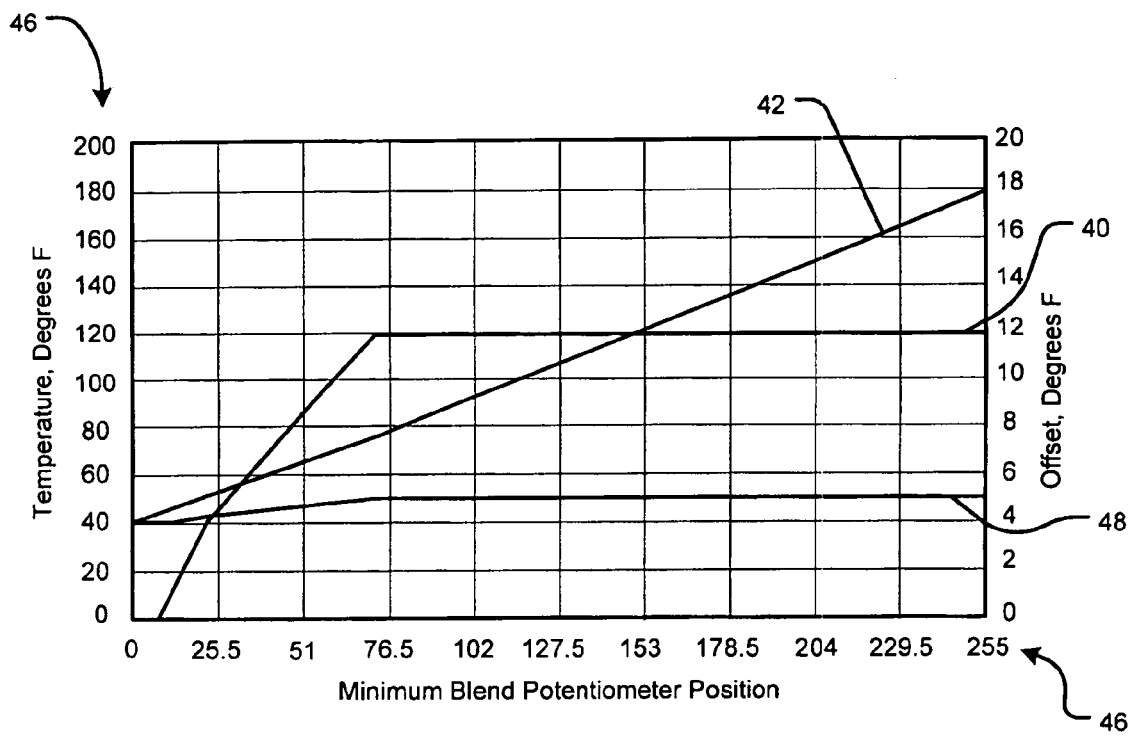
FIG. 3 illustrates a temperature offset according to the present invention.
FIG. 4 illustrates an offset lookup table according to the present invention.

The controller determines the offset 40 according to blend potentiometer position, which is indicative of the desired temperature, and a target evaporator air temperature 42 as shown in FIG. 3. Blend potentiometers partially control the position of a corresponding blend valve according to the desired temperature. The blend valves determine an amount of hot air that is blended with the cooled air from the evaporator. The blend potentiometer position is represented on the x-axis 44 in terms of a digital resolution of 256. Temperature is represented on the y-axis 46 in degrees Fahrenheit. As the blend potentiometer position increases, the target evaporator air temperature 42 increases linearly from 38° F. at blend potentiometer position 0 to 178° F. at blend potentiometer position 255. The offset 40 also increases, but reaches a maximum of 12° F. at blend potentiometer position 70. When the offset 40 is 12° F., the target evaporator air temperature is 76° F. The controller cools the air to the low band temperature 48, which is equal to the conventional low band temperature of 38° F. adjusted by the offset 40. For example, at blend potentiometer position 0, the offset 40 is 0. Therefore, the low band temperature 48 is 38° F. Similarly, at blend potentiometer position 70, the offset is 12° F., and the low band temperature 48 is 50° F.

An offset lookup table 50 is shown in FIG. 4. The offset lookup table 50 provides an offset and low band temperature according to the data in FIG. 3. The controller receives the blend potentiometer position and consults the lookup table 50 to determine the offset and the corresponding low band. The controller then controls the evaporator to cool the air to the low band temperature. It should be noted that the values used in FIGS. 3 and 4 are exemplary, and other suitable values may be used to achieve similar results.

It is to be understood that although the preferred embodiment uses offset and low band values as shown in FIG. 3 and FIG. 4, other values are possible. For example, the maximum value for the low band temperature is 50° F. as shown in FIG. 4. The maximum low band temperature is chosen to be a predetermined amount, such as 4° F., below a maximum average evaporator temperature. In the preferred embodiment, the maximum average evaporator temperature is 54° F. Therefore, the maximum offset is chosen to be 12° F. to ensure that the maximum low band temperature is 50° F., or 4° F. below the maximum average evaporator temperature. Additionally, the use of the offset may be phased in rather than used immediately. For example, the controller may operate conventionally for a specific duration after an initial AC request by the user. The offset can then be phased in over a period of time. In this manner, moisture is removed from the vehicle interior more quickly. In another embodiment, the controller may be adjusted according to different temperature requests from one or more passengers. For example, if only a driver is present, the offset is determined based solely on the driver's temperature request. In contrast, if a passenger is present, a modified offset may be used. Additionally, other suitable values for the maximum low band temperature and the maximum average evaporator temperature may be used.

Figure 5:
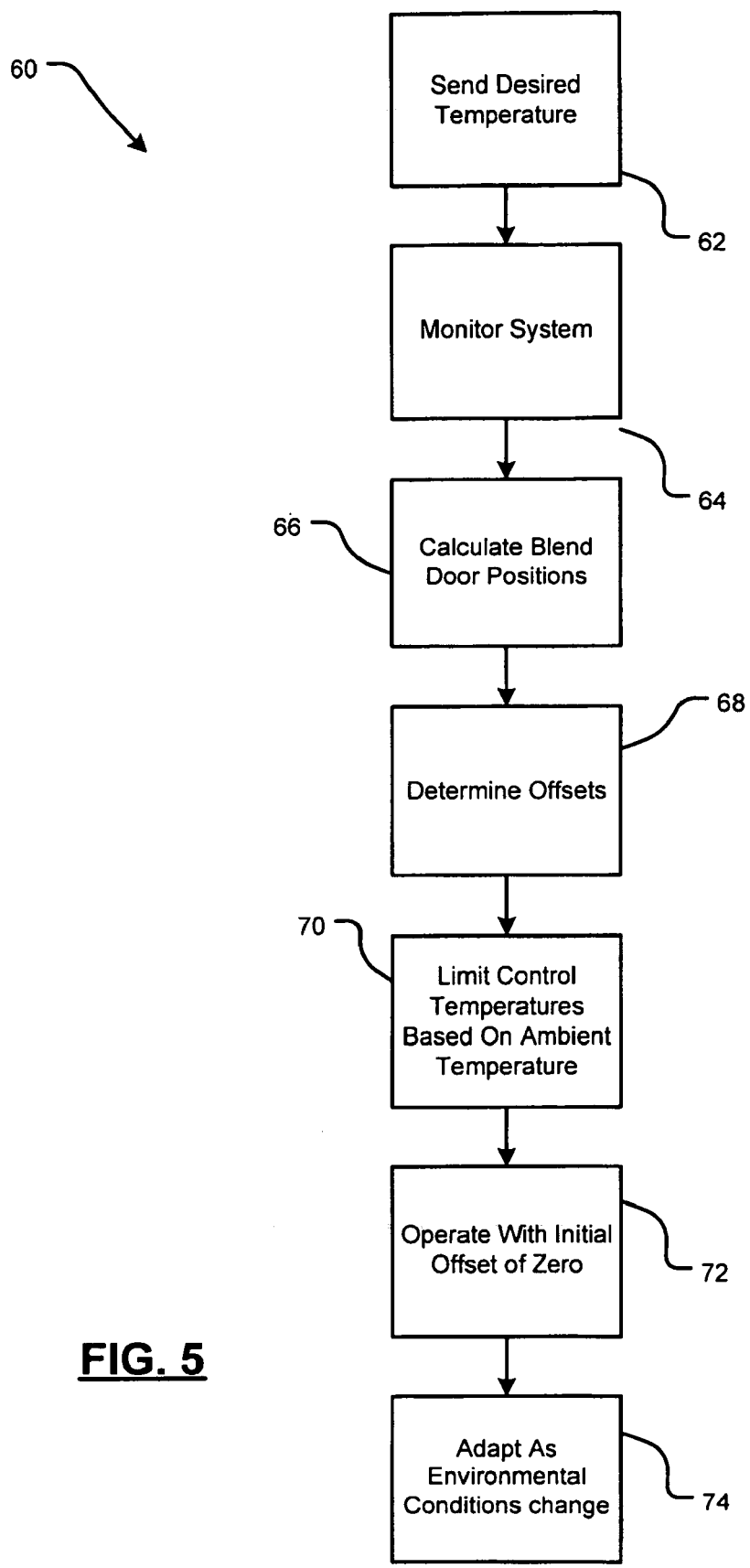
FIG. 5 is a modulated evaporator outlet temperature algorithm according to the present invention.

A modulated evaporator outlet temperature method 60 is shown in FIG. 5. At step 62, a desired temperature is sent to the controller. For example, a user requests the desired temperature with conventional air conditioner controls, such as a knob or dial. Alternatively, the desired temperature may be generated upon ignition or initial powering on of the vehicle. The controller monitors various factors affecting the operation of the climate control system at step 64. These factors include, but are not limited to, the evaporator, ambient temperature, and the desired temperature. The controller calculates the position of the blend valves according to the blend potentiometers and the desired temperature, the evaporator temperature, and the temperature of the hot air from the heater core at step 66.

The controller determines the offset based on the data in FIGS. 3 and 4 at step 68. If any blend potentiometer is set at zero, or full cold, the offset is zero, and the climate control system may operate in a conventional manner. The controller may limit evaporator temperatures based on a combination of a configurable offset below the current ambient temperature, a configurable upper bound, and a configurable minimum temperature at step 70. For example, the controller limits compressor operation to prevent window fog. Typically, if the interior cabin dew point temperature is below the glass surface temperature, window fogging does not occur. Therefore, the controller ensures that the compressor and/or evaporator operation are limited to maintain a maximum temperature that is a fixed amount below the current ambient temperature. In one embodiment, the controller operates the compressor to release the compressor clutch, thereby turning off the compressor, at a temperature that is a configurable value below the ambient temperature, accounting for hysteresis. Additional factors may include a maximum allowable compressor clutch off temperature and a minimum compressor off temperature relative to ambient temperature.

At step 72, the controller operates the climate control system with an offset of zero during initial operation, and phases in the offset according to compressor cycles. For example, if the desired temperature is full cold, the offset is initially zero. If the desired temperature is increased, the evaporator temperature is increased gradually rather than immediately to mitigate the effects from the change in humidity. At step 74, the controller continues to monitor system variables, determines proper control of the compressor and evaporator, and adapts as necessary in order to maintain the desired temperature.

Figure 6:
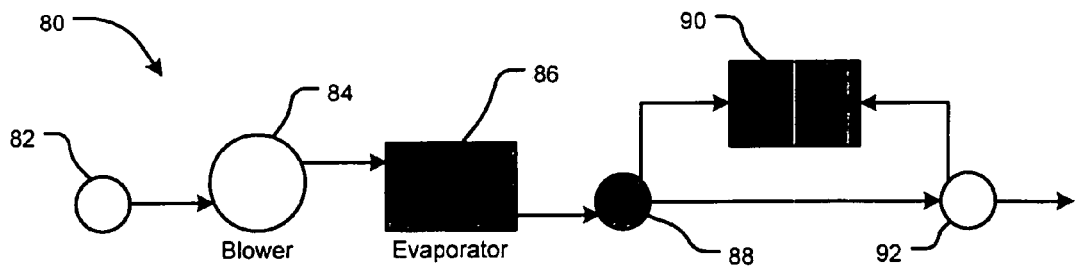
FIG. 6 is an energy balance diagram for blend door position calculation according to the present invention.

The controller calculates the blend valve position to provide the desired air temperature according to the blend potentiometer position as shown in FIG. 6. An energy balance diagram 80 includes an input node 82, a blower node 84, an evaporator node 86, a blend valve node 88, a heater core node 90, and a mix node 92. The total of all air in the system leaves the blower node 84 and is cooled at the evaporator node 86. The blend valve node receives the cold air and diverts a portion of the cold air to the heater core node 90 and a portion of the cold air to the mix node 92. Hot air from the heater core node 90 and the cold air are mixed together at the mix node 92. The controller calculates energy balance at the mix node 92. The controller calculates the temperature output from the mix node 92 according to $T_{out}=T_{c\_expected}+[(T_{h\_expected}-T_{c\_expected})*(\%\ above\ full\ cold)]$, where $T_{out}$ is temperature output from the mix node 92, $T_{c\_expected}$ is expected temperature output of the blend valve node 88, $T_{h\_expected}$ is expected temperature output of the heater core node 90, and % above full cold corresponds to an amount the desired temperature is above the minimum possible temperature. The output of the heater core node 90 is $T_{hot}=T_{h\_water}*10$, where $T_{h\_water}$ is the temperature of the water solution in the heater core. Therefore, the desired blend valve position is Blend Pos %=$(T_{mix}-T_{cold})/(T_{hot}-T_{cold})$, where $T_{mix}$ is temperature output of the mix node 92.

Figure 7:
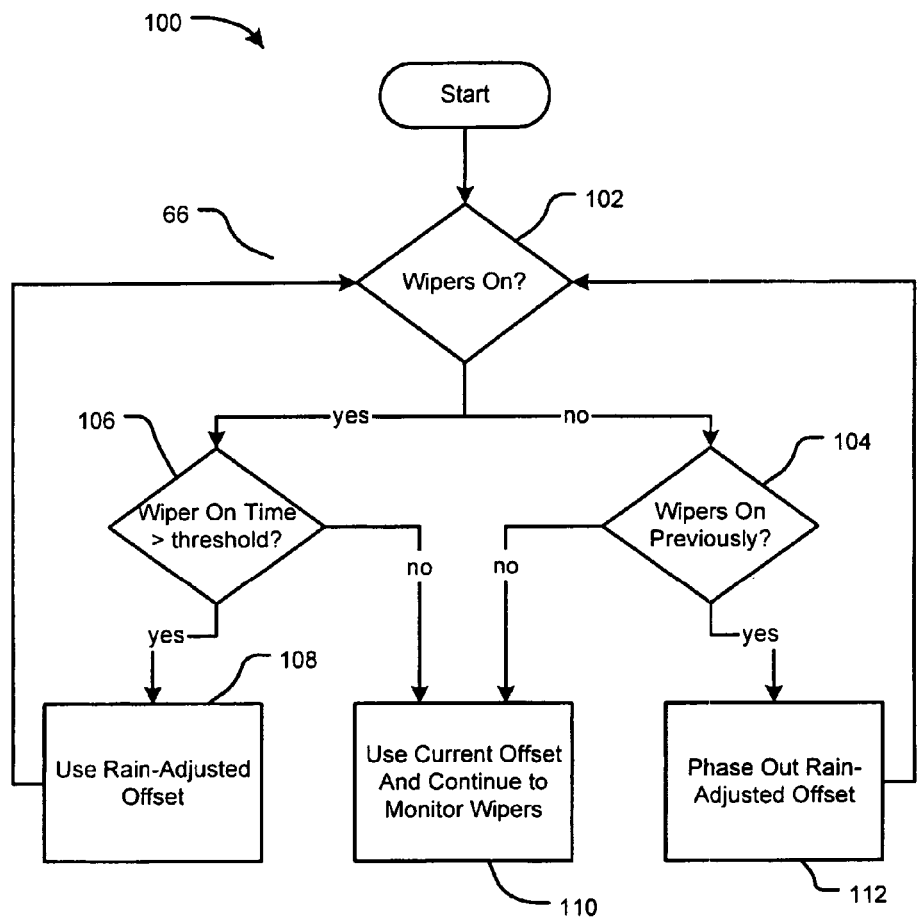
FIG. 7 is a rain sensing and adjusting algorithm according to the present invention.

The modulation method of the present invention may include a rain sensing and adjustment algorithm 100 as shown in FIG. 7. The algorithm 100 monitors the state of the windshield wipers to determine if the wipers are on or off at step 102. If the wipers are off, the algorithm 100 continues to step 104. If the wipers are on, the algorithm 100 determines the duration of time that the wipers have been on at step 106. If the duration is above a threshold, the algorithm 100 continues to step 108. At step 108, the offset is adjusted according to a configurable rain factor. For example, the offset can be set to 0 if it is determined that the offset is unnecessary during rain conditions. If the duration is below the threshold, the algorithm 100 continues to step 110, and the current offset is used. At step 104, the algorithm 100 determines if the wipers were previously on. If the wipers have been off for a significant length of time, the algorithm 100 continues to step 110. If the wipers were recently on, the algorithm phases out the rain factor at step 112.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle climate control method comprising:
   determining a desired temperature;
   determining a target temperature for air output from an evaporator that is indicative of the desired temperature;
   calculating a temperature offset according to the desired temperature and the target temperature; and
   cooling the air according to a minimum temperature adjusted upward by the temperature offset.

2. The method of claim 1 wherein the step of determining the target temperature includes determining the target temperature according to a position of a potentiometer.

3. The method of claim 1 wherein the step of calculating includes referencing a table of predetermined values for the temperature offset.

4. The method of claim 1 wherein the step of calculating includes calculating the temperature offset according to at least one of ambient temperature, precipitation, and humidity.

5. The method of claim 1 wherein said minimum temperature is substantially close to freezing.

6. The method of claim 5 wherein substantially close to freezing includes temperatures within 6 degrees Fahrenheit of freezing.

7. The method of claim 1 further comprising determining a position of a potentiometer that is indicative of the desired temperature.

8. A vehicle climate control method comprising:
   determining a desired temperature;
   determining a target temperature for air output from an evaporator that is indicative of the desired temperature;
   calculating a temperature offset according to the desired temperature and the target temperature; and
   cooling the air according to a minimum temperature adjusted by the temperature offset; and
   calculating a position of a blend door according to the desired temperature, the target temperature, and a temperature of air output from a heater core.

9. A vehicle climate control method comprising:
   selecting a desired temperature;
   determining a blend potentiometer position that is indicative of the desired temperature;
   determining an evaporator temperature that is indicative of the desired temperature and the blend potentiometer position;
   calculating a temperature offset according to the desired temperature, the blend potentiometer position, and the evaporator temperature;
   controlling the vehicle climate based on a result of the calculating a temperature offset step
   determining a heater core air temperature; and
   calculating a blend door position according to the blend potentiometer position, the evaporator temperature, the temperature offset, and the heater core air temperature.

10. The method of claim 9 wherein the step of calculating the temperature offset includes referencing a table of predetermined values for the temperature offset.

11. A vehicle climate control system comprising:
    a temperature module that determines a desired temperature;
    an evaporator that cools air to a target temperature that is indicative of the desired temperature;
    a temperature offset module that calculates a temperature offset according to the desired temperature and the target temperature;
    a controller that operates the evaporator according to the desired temperature, the target temperature, and the temperature offset;
    a blend potentiometer that generates a blend potentiometer position signal indicative of the desired temperature; and
    a blend door positioned according to the blend potentiometer position signal, the target temperature, and the offset.

12. The vehicle climate control system of claim 11 wherein the temperature offset module references a table of predetermined values for the temperature offset.

* * * * *